(12) United States Patent
Faulkner et al.

(10) Patent No.: US 12,717,109 B2
(45) Date of Patent: Aug. 25, 2026

(54) ROUTING TOOL FOR INSTALLATION OF FIBER OPTIC CABLES AND METHOD OF USING SAME

(71) Applicant: CORNING RESEARCH & DEVELOPMENT CORPORATION, Corning, NY (US)

(72) Inventors: Michael Todd Faulkner, Granite Falls, NC (US); Lars Kristian Nielsen, Denver, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 351 days.

(21) Appl. No.: 18/469,084

(22) Filed: Sep. 18, 2023

(65) Prior Publication Data

US 2024/0126040 A1 Apr. 18, 2024

Related U.S. Application Data

(60) Provisional application No. 63/415,771, filed on Oct. 13, 2022.

(51) Int. Cl.
*G02B 6/54* (2006.01)

(52) U.S. Cl.
CPC .................................... *G02B 6/54* (2013.01)

(58) Field of Classification Search
CPC .. G02B 6/4457; G02B 6/44515; G02B 6/475; G02B 6/44524; G02B 6/4453;
(Continued)

(56) References Cited

U.S. PATENT DOCUMENTS 514,104 A * 2/1894 Wickey .................. B65H 75/44 242/129.7
2,962,240 A * 11/1960 Mcgayhey ............ G03B 21/32 242/328

(Continued)

FOREIGN PATENT DOCUMENTS

WO 2021/247709 A1 12/2021

OTHER PUBLICATIONS

Extended European Search Report ,23202365.5; dated Mar. 5, 2023; 8 pages; European Patent Office.

*Primary Examiner* — Vivek D Koppikar
*Assistant Examiner* — Henrix Soto
(74) *Attorney, Agent, or Firm* — Adam R. Weeks

(57) ABSTRACT

A routing tool for the installation of a fiber optic cable along a cable support includes a cable support frame having a mounting interface, wherein the cable support frame is selectively attachable to and detachable from the cable support, and a dispensing platform configured to have the fiber optic cable arranged thereon and selectively attachable to and detachable from the cable support frame. The dispensing platform is configured to be rotatable relative to the cable support frame about a rotational axis. The rotational axis is configured to be laterally offset from the mounting interface. A method of installing a fiber optic cable using the routing tool includes attaching the cable support frame to the cable support, attaching the dispensing platform to the cable support, and dispensing the fiber optic cable from the routing tool to route the cable along the cable support.

19 Claims, 8 Drawing Sheets

(58) Field of Classification Search
CPC ........ G02B 6/48; G02B 6/4459; H02G 11/02; H02G 1/02; H02G 3/0437; H02G 3/0456; B65H 18/026; B65H 75/02; B65H 75/18; B65H 75/4457; B65H 75/446; B65H 49/32; B65H 49/327; B65H 49/325; B65H 49/28; B65H 2402/43
See application file for complete search history.

(56) References Cited

U.S. PATENT DOCUMENTS 3,258,220 A * 6/1966 Munger ............... B65H 75/406 242/404.1
3,319,906 A * 5/1967 Atkinson ............. B65H 49/327 242/597.4
3,383,071 A * 5/1968 Godson ................ B65H 49/321 242/598.5
3,837,597 A * 9/1974 Bourhenne ........... B65H 49/20 242/129
4,003,528 A * 1/1977 Booze .................... B65H 59/04 242/608.5
4,541,586 A * 9/1985 Crowe ................... B65H 49/32 242/597.5
5,348,241 A * 9/1994 Huette ................... B65H 49/28 242/129
5,499,727 A * 3/1996 Koch ...................... A47F 7/005 211/85.5
5,559,922 A * 9/1996 Arnett .................. G02B 6/4457 385/136
5,988,559 A * 11/1999 Gnass .................... A62C 33/04 242/395
6,269,213 B1 * 7/2001 Ohta .................... G02B 6/4457 385/136
6,533,205 B1 * 3/2003 Kles ....................... B65H 54/58 242/577.4
6,554,218 B2 * 4/2003 Buyce .................... H02G 11/02 242/396.5
6,633,718 B1 * 10/2003 Thom .................. G02B 6/4459 385/136
7,627,224 B1 12/2009 Cassidy et al.
8,070,112 B2 12/2011 Smrha et al.
8,113,475 B2 * 2/2012 Whittemore ............ E04G 21/24 248/231.51
9,459,425 B2 * 10/2016 Smith ...................... G02B 6/47
9,550,460 B2 * 1/2017 Tsubaki .............. B60R 16/0215
10,050,426 B2 * 8/2018 Sano ...................... H02G 3/083
10,488,612 B2 * 11/2019 Gonzalez Covarrubias ................ G02B 6/4453
10,527,811 B2 * 1/2020 Burek ................ G02B 6/44528
10,617,026 B2 * 4/2020 Su ........................ H05K 7/1427
11,231,557 B2 * 1/2022 Parsons .................... G02B 6/44
2011/0249949 A1 10/2011 Griffiths et al.
2017/0146763 A1 5/2017 Galvan Mijangos et al.
2020/0358277 A1 11/2020 Kewitsch

* cited by examiner 18
32
36
34
26
28
30

40
44
100
104
106
112
120
102
118
116
82
88
86
76
84
50
74
78
42
110
108
80
66
72
62
48
68
70
90
124
92
54
46
56
58
64
128
52
36
122

ROUTING TOOL FOR INSTALLATION OF FIBER OPTIC CABLES AND METHOD OF USING SAME

PRIORITY APPLICATION

This application claims the benefit of priority of U.S. Provisional Application No. 63/415,771, filed on Oct. 13, 2022, the content of which is relied upon and incorporated herein by reference in its entirety.

TECHNICAL FIELD

This disclosure relates generally to fiber optic cables, and more particularly to a routing tool for improving the installation of a fiber optic cable along a cable support within a data center or other fiber optic cable environment. The disclosure also relates to a method of using the routing tool to install a fiber optic cable.

BACKGROUND

The large amount of data and other information transmitted over the internet has led businesses and other organizations to develop large scale data centers for organizing, processing, storing and/or disseminating large amounts of data. Data centers contain a wide range of network equipment including, for example, servers, networking switches, routers, storage subsystems, etc. Data centers further include a large amount of cabling and racks to organize and interconnect the network equipment in the data center. Modern data centers may include multi-building campuses having, for example, one primary or main building and a number of auxiliary buildings in close proximity to the main building. All the buildings on the campus are interconnected by a local fiber optic network.

Data center design and cabling-infrastructure architecture are increasingly large and complex. To manage the interconnectivity of a data center, the network equipment within the buildings on the data center campus is often arranged in structured data halls having a large number of spaced-apart rows. Each of the rows is, in turn, configured to receive a number of racks or cabinets (e.g., twenty racks or cabinets) which hold the network equipment. In a common cable-infrastructure architecture, each of the rows includes a main patch panel, which may be at a front or head end of the row. Distribution cables with relatively large number of optical fibers (high fiber counts) are routed from a building distribution frame (sometimes referred to as a main distribution frame) to the patch panels for the different rows of equipment racks. At the patch panels, a large number of distribution fiber optic cables with lower fiber counts are connected to the optical fibers of the associated high fiber count distribution cable(s) and routed along the row to connect to the network equipment held in the various racks in the row. To organize the large number of distribution fiber optic cables, each row typically includes a cable tray or basket disposed above the row for supporting the in-row distribution fiber optic cables as they extend along the row. The network equipment in the racks is optically connected to the distribution fiber optic cables by technicians during the construction of the data center.

To route the distribution fiber optic cables along the cable tray, each distribution cable is typically unpackaged, unwound and laid out so as to extended along the floor of the installation site adjacent the cable tray. Subsequently, two or more technicians will then route the distribution cable along the cable tray by pulling the cable from one of its ends towards the other end of the row. Once positioned in the cable tray, the distribution cable may be connected to the patch panel at the head end of the row and the network equipment in one of the racks of the row.

While current data center design and cabling-infrastructure architecture are satisfactory for the current needs of the industry, the labor, installation time, and costs to achieve cable installation can be high. For these reasons, manufacturers continually strive to improve cable installation in the data center.

SUMMARY

In one aspect of the disclosure, a routing tool for the installation of one or more fiber optic cables along a cable support is disclosed. The routing tool includes a cable support frame having a mounting interface and is configured to be selectively attached to and detached from the cable support at the mounting interface. The routing tool further includes a dispensing platform configured to have the one or more fiber optic cable arranged thereon and configured to be selectively attached to and detached from the cable support frame. The dispensing platform is further configured to be rotatable relative to the cable support frame about a rotational axis when the dispensing platform is attached thereto. The cable support frame is configured such that the rotational axis is laterally offset from the mounting interface.

In one embodiment, the mounting interface of the cable support frame may include at least one J-shaped mounting bracket defining a recess configured to receive a portion of the cable support therein. For example, in one embodiment the mounting interface preferably includes at least two spaced-apart, J-shaped mounting brackets for attaching the cable support frame to the cable support. The spaced apart arrangement of the mounting brackets provides stability to the cable support frame when mounted on the cable support.

In one embodiment, the cable support frame may include at least one extension arm configured to extend from the mounting interface. For example, in one embodiment the cable support frame preferably includes at least two extension arms extending from the mounting interface. The extension arms may converge toward each other in a generally triangular configuration. In one embodiment, the at least one extension arm may be permanently connected to the mounting interface, such as to respective mounting brackets that form the mounting interface. In another embodiment, however, the at least one extension arm may be configured to be selectively attached to and detached from the mounting interface via a releasable connection. Thus, some assembly may be required to form the cable support frame from separate components.

In one embodiment, the cable support frame may further include a post configured to be connected to the at least one extension arm of the cable support frame. The post is configured to be selectively attached to and detached from the dispensing platform to thereby provide the lateral offset between the rotational axis and the mounting interface. In one embodiment, the post may be permanently connected to the at least one extension arm, such as at an outer end opposite to an inner end configured to be attached to the mounting interface. In another embodiment, however, the post may be configured to be selectively attached to and detached from the at least one extension arm via a releasable connection. Thus, again, some assembly may be required to form the cable support frame from separate components.

In one embodiment, the dispensing platform may include a base wall having a central hub that defines the rotational axis and an upturned flange extending along a periphery of the base wall. In one embodiment, the base wall may include a drum that defines an inner boundary for the one or more fiber optic cables when the one or more fiber optic cables are arranged thereon. For example, the one or more fiber optic cables may be wound around the drum to arrange the one or more fiber optic cables thereon. In one embodiment, the drum may include a plurality of circumferentially spaced columns. In a further embodiment, the base wall may include a plurality of fenestrations. The fenestrations provide locations for tie downs or other fasteners for organizing and/or securing the one or more fiber optic cables on the dispensing platform. In one embodiment, the at least one extension arm and the dispensing platform may be sized such that when the dispensing platform is attached to the cable support frame, an outer edge of the dispensing platform is radially outboard of the mounting interface.

In one embodiment, the routing tool may include a spindle configured to be disposed between the cable support frame and the dispensing platform, the spindle including a bearing arrangement to allow relative rotation between the cable support frame and the dispensing platform. In one embodiment, the spindle may be associated with and generally carried by the cable support frame. In another embodiment, the spindle may be associated with and generally carried by the dispensing platform. In one embodiment, the spindle may include a first shaft configured to be connected to the dispensing platform, a second shaft configured to be connected to the cable support frame, and a bearing arrangement connecting the first and second shafts to provide relative rotation therebetween.

In another aspect of the disclosure, a method of installing one or more fiber optic cables along a cable support using the routing tool according to the first aspect described above is disclosed. The method includes attaching the cable support frame to the cable support; attaching the dispensing platform to the cable support frame, the dispensing platform having the one or more fiber optic cables arranged thereon; and dispensing the one or more fiber optic cables from the routing tool to route the one or more fiber optic cables along the cable support.

In one embodiment, the cable support includes a base wall and two side walls extending from the base wall, and attaching the cable support frame to the cable support further includes attaching the cable support frame to one of the side walls of the cable support. For example, attaching the cable support frame to the cable support may include hooking the cable support frame to an upper edge of one of the side walls of the cable support. This provides a quick and convenient way to connect the cable support frame to the cable support.

In one embodiment, the cable support frame may have its components permanently connected together such that the cable support frame forms a unitary body. In another embodiment, however, the components that make up the cable support frame may be separable from each other, and the method may further include assembling the cable support frame prior to attaching the cable support frame to the cable support. For example, the at least one extension arm may be selectively attached to and detached from the mounting interface by a releasable connection. Moreover, the post may be selectively attached to and detached from the at least one extension arm via a releasable connection. These releasable connections may include finger and slot arrangements that allow for assembly and disassembly of the cable support frame in a quick and convenient manner.

In one embodiment, the method may include arranging the one or more fiber optic cables on the dispensing platform at a field location. For example, the one or more fiber optic cables may be packaged and shipped to the field location. Then at the filed location, a technician may remove the one or more fiber optic cables from their package and arrange the one or more cables on the dispensing platform. In an alternative embodiment, however, the method may include arranging the one or more fiber optic cables on the dispensing platform at a manufacturing location and then shipping the dispensing platform and the one or more fiber optic cables to a field location for use with the routing tool. Then at the field location, the technician may remove the dispensing platform having the one or more fiber optic cables already arranged thereon from the package and attach the dispensing platform to the cable support frame.

In one embodiment, dispensing the one or more fiber optic cables from the routing tool may further include pulling the one or more fiber optic cables from the dispensing platform and into the cable support. As the one or more fiber optic cables are being pulled, the dispensing platform rotates relative to the cable support frame to pay out the one or more fiber optic cables from the dispensing platform.

In one embodiment, the method may further include detaching the dispensing platform from the cable support frame and detaching the cable support frame from the cable support. For example, the routing tool may not be intended to form a permanent part of the cabling architecture but instead be used in a temporary manner to route the one or more fiber optic cables along the cable support. In one embodiment, the method may include disassembling the cable support frame into its various components. This may facilitate storage and transport of the routing tool.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to a routing tool for installing one or more distribution fiber optic cables along a cable support in a data center or other fiber optic environment. The routing tool includes a cable support frame that is selectively attachable to and detachable from the cable support frame, and a distribution platform that is selectively attachable to and detachable from the cable support frame. The distribution platform is rotatable relative to the cable support frame and is configured to carry the distribution fiber optic cable thereon. In use, a field technician may attach the cable support frame to an end of a cable support, such as at a head end or a tail end of the cable support, and then attach the dispensing platform to the cable support frame. The field technician may then pull on an end of the distribution cable arranged on the dispensing platform to route the distribution cable along the cable support. The pulling of the distribution cable by the field technician causes the dispensing platform to rotate relative to the cable support frame and thereby easily payout a length of the distribution cable for routing along the cable support. By using the routing tool described herein, the routing of distribution cables may be performed quickly, easily, and by fewer technicians than what is experienced by current installation methods. Thus, data center construction may occur more quickly and at lower cost.

Figure 1:
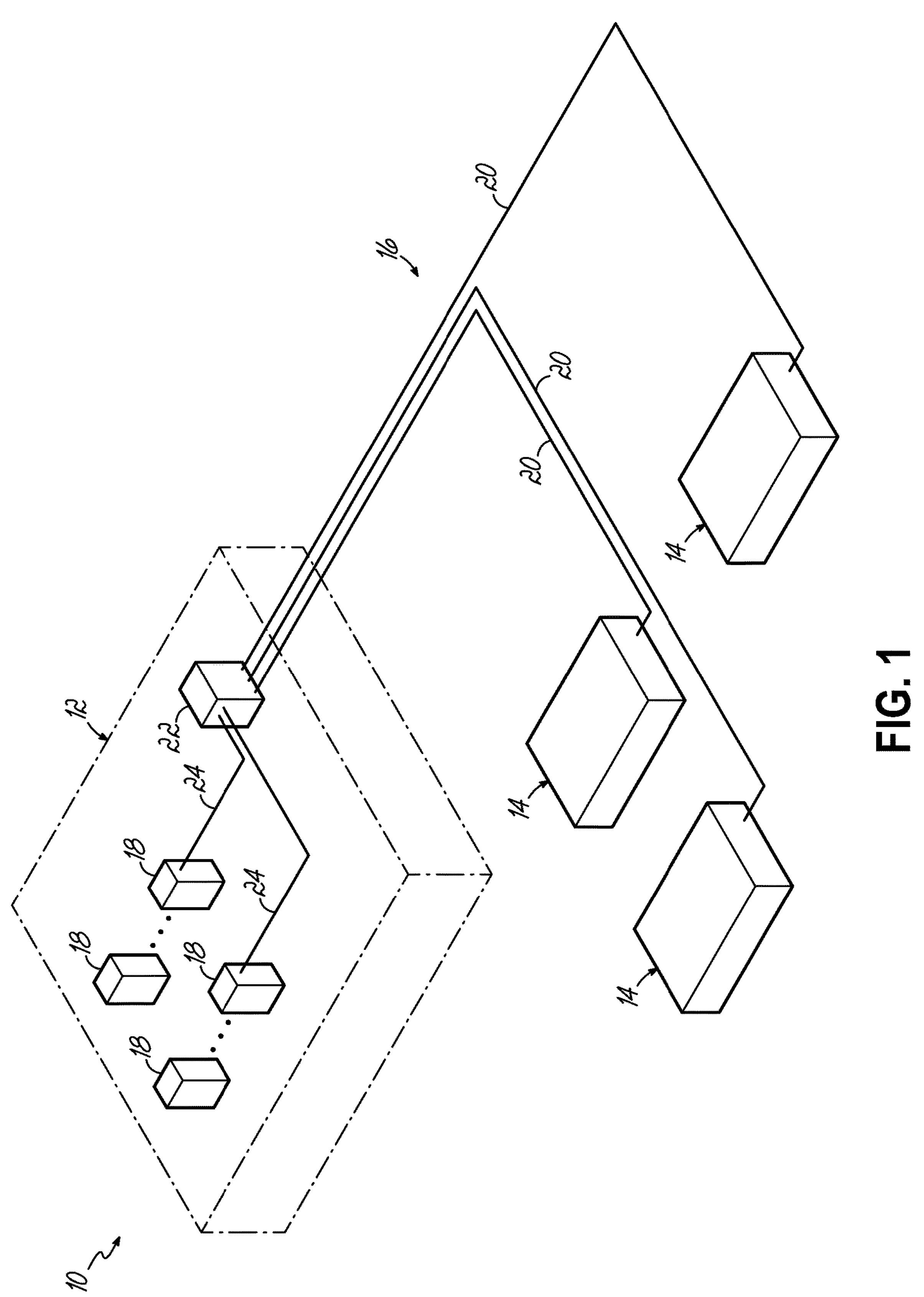
FIG. 1 is a schematic illustration of a data center campus according to an exemplary embodiment of the disclosure.

As illustrated in FIG. 1, a modern-day data center 10 may include a collection of buildings (referred to as a data center campus) having, for example, a main building 12 and one or more auxiliary buildings 14 in close proximity to the main building 12. While three auxiliary buildings are shown, there may be more or less depending on the size of the campus. The data center 10 provides for a local fiber optic network 16 that interconnects the auxiliary buildings 14 with the main building 12. The local fiber optic network 16 allows network equipment 18 in the main building 12 to communicate with various network equipment (not shown) in the auxiliary buildings 14. In the exemplary embodiment shown, the local fiber optic network 16 includes trunk cables 20 extending between the main building 12 and each of the auxiliary buildings 14. Conventional trunk cables 20 generally include a high fiber-count arrangement of optical fibers for passing data and other information through the local fiber optic network 16. In the example illustrated in FIG. 1, the trunk cables 20 from the auxiliary buildings 14 are routed to one or more distribution cabinets 22 housed in the main building 12 (one shown).

Within the main building 12, a plurality of indoor fiber optic cables 24 ("indoor cables 24") are routed between the network equipment 18 and the one or more distribution cabinets 22. The indoor cables 24 generally include a high fiber-count arrangement of optical fibers for passing data and other information from the distribution cabinets 22 to the network equipment 18. Although only the interior of the main building 12 is schematically shown in FIG. 1 and discussed above, each of the auxiliary buildings 14 may house similar equipment for similar purposes. Thus, although not shown, each of the trunk cables 20 may be routed to one or more distribution cabinets 22 in one of the auxiliary buildings 14 in a manner similar to that described above. Furthermore, each of the auxiliary buildings 14 may include indoor cables 24 that extend between network equipment 18 and the one or more distribution cabinets 22 of the auxiliary building 14.

Figure 2:
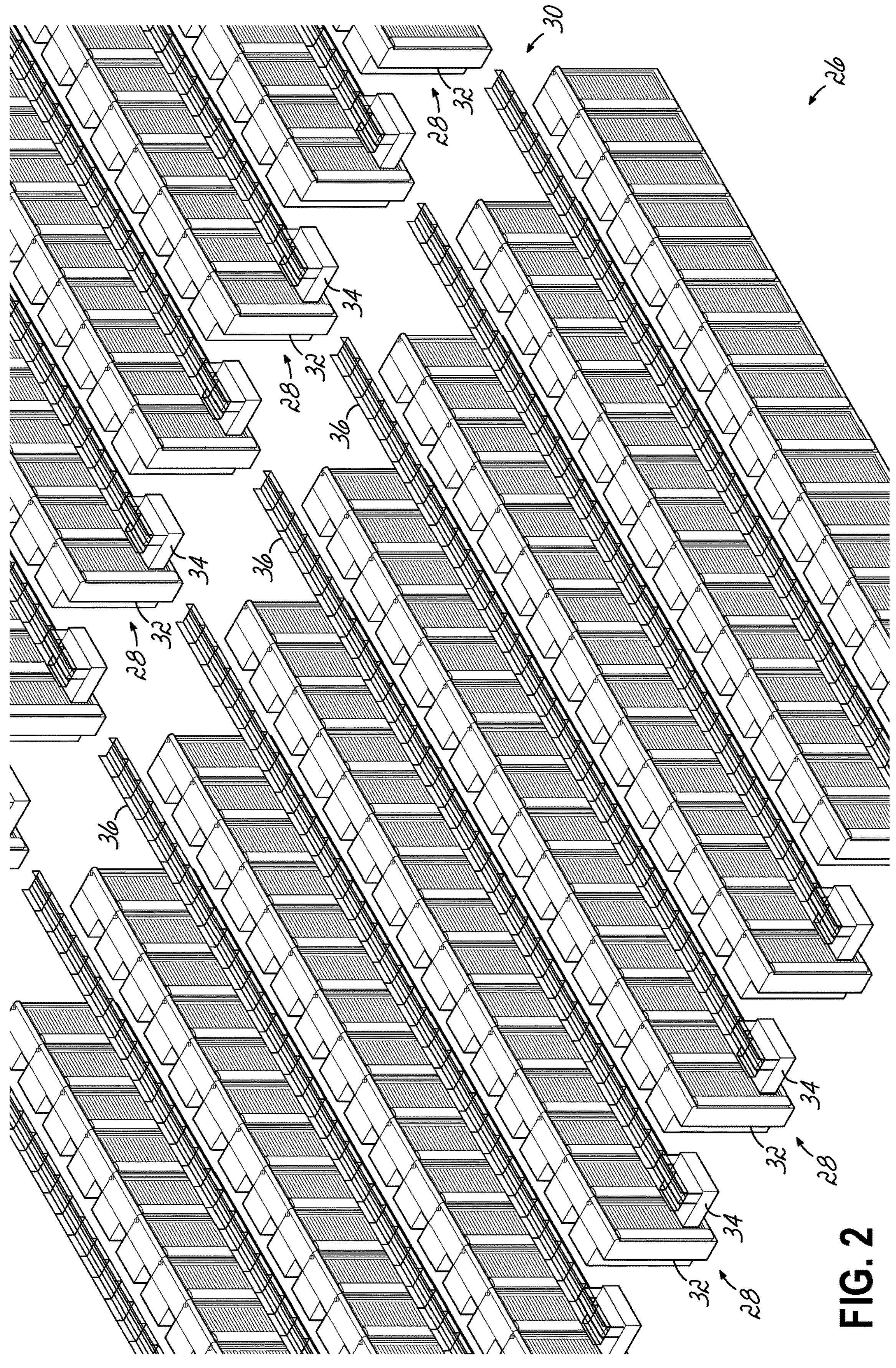
FIGS. 2 and 2A are partial perspective views of an exemplary data hall of the data center shown in FIG. 1 according to one embodiment.
Figure 2A:
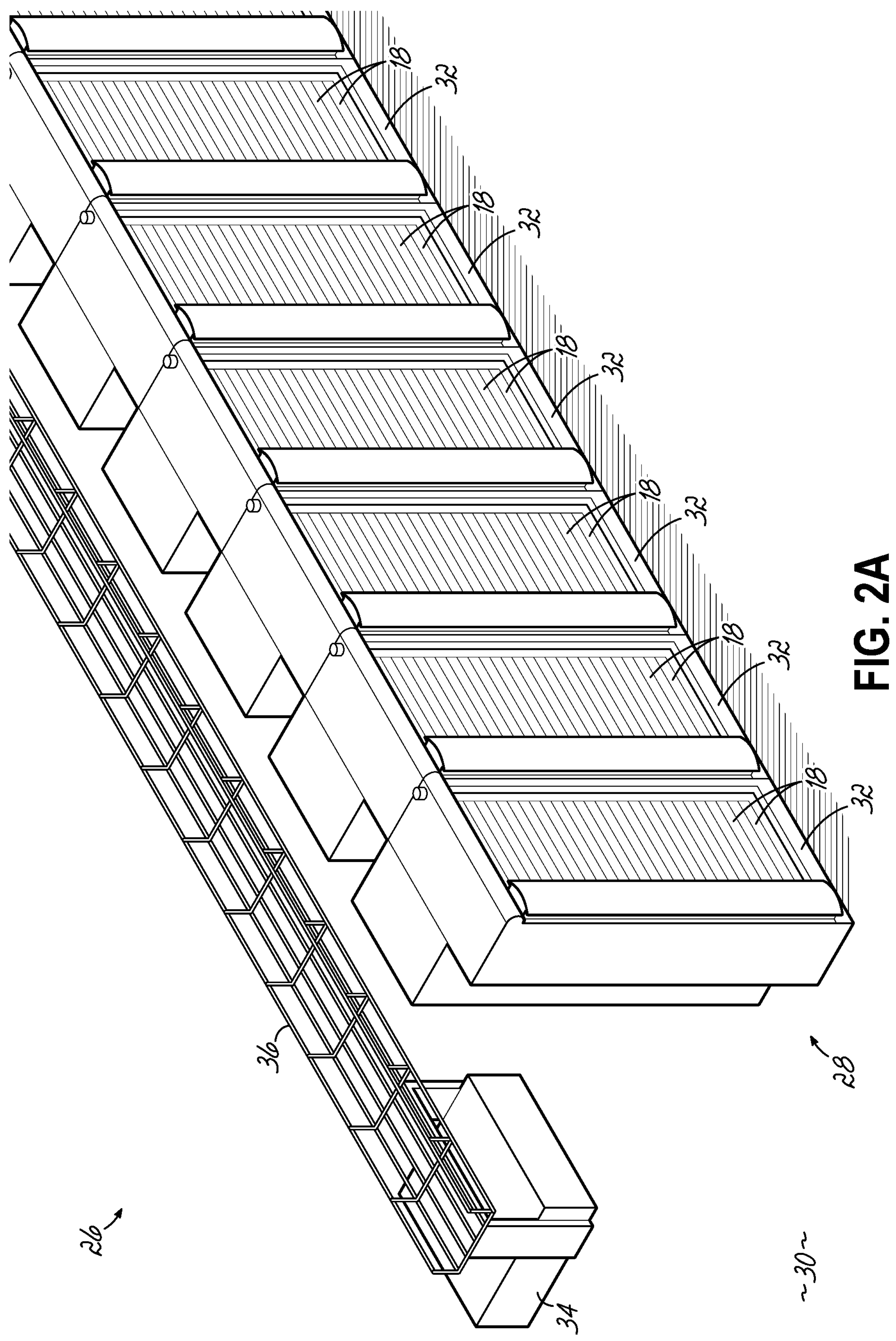
Figure 3:
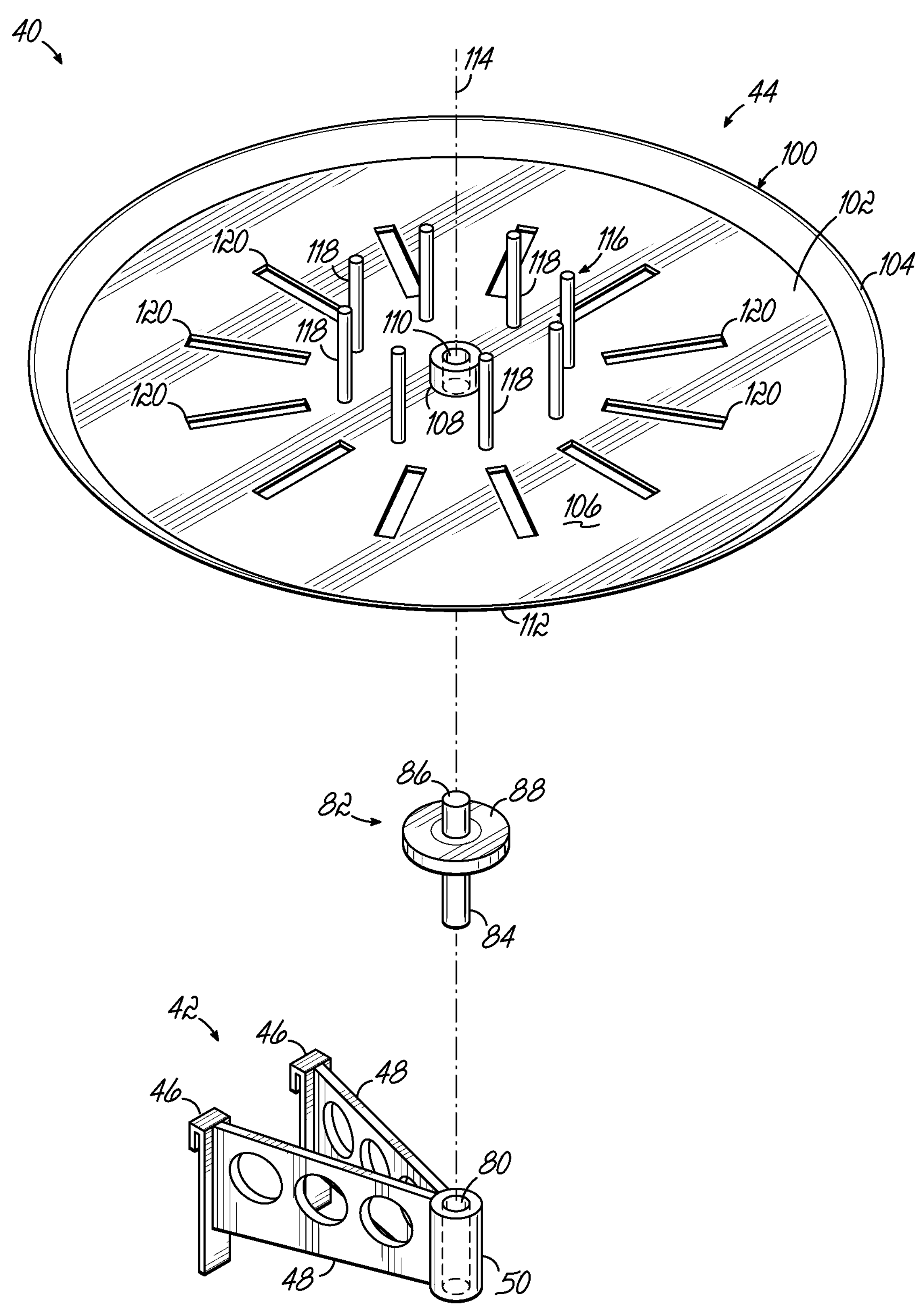
FIG. 3 is a disassembled perspective view of a routing tool in accordance with one embodiment of the disclosure.

As illustrated in more detail in FIGS. 2 and 2A, the network equipment 18 in the main building 12 or an auxiliary building 14 may be arranged in one or more data halls 26 that generally include a plurality of spaced-apart rows 28 on one or both sides of an access pathway 30. The arrangement of the data halls 26 into rows 28 helps organize the large number of equipment, fiber optic cables, fiber optic connections, etc. Each of the rows 28 includes a plurality of racks or cabinets 32 (referred to hereafter as "racks 32") generally arranged one next to the other along the row 28. Each of the racks 32 are vertically arranged frames for holding various network equipment 18 of the data center 10, as is generally known in the fiber optics industry. In one common arrangement, and as further illustrated in FIG. 2, each row 28 may include a patch panel 34 at the front or head end of the row 28 closest to the access pathway 30. The patch panel 34 represents a termination point of at least some of the optical fibers carried by one or more of the indoor cables 24, for example. In other embodiments, the patch panel 34 may be located within the associated row, such as in the middle of the row.

As discussed above, in a conventional arrangement, one or more distribution cables are connected to the patch panel 34 of the row 28 and routed along a cable support 36, such as a cable tray, generally disposed above the row 28. The network equipment 18 in the racks 32 is then optically connected to the one or more distribution cables to provide the interconnectivity of the network equipment 18 of the data center 10. Aspects of the present disclosure are directed to a routing tool and to an improved method of installing a distribution fiber optic cable along a row 28 of the data center 10 using the routing tool. Although the routing tool and its method of use will be discussed in more detail below in the context of a fiber optic distribution cable connected between the patch panel 34 and the network equipment 18 in the racks 32 of a row 28, the routing tool and its use are not limited to such an application. Accordingly, it should be understood that the routing tool may be used in other contexts of a data center, or other contexts of a fiber optic network more generally.

FIGS. 3-6 illustrate a routing tool 40 in accordance with an embodiment of the disclosure for installing one or more distribution cables 38. The routing tool 40 includes a cable support frame 42 configured to be selectively attached to and detached from the cable support 36 and a dispensing platform 44 configured to hold the one or more fiber optic distribution cables 38 to be installed and configured to be selectively attached to and detached from the cable support frame 42. When the dispensing platform 44 is attached to the cable support frame 42, this dispensing platform 44 is configured to be rotatable relative to the cable support frame 42, as illustrated by arrow A in FIG. 4.

The cable support frame 42 may be formed from multiple components and include at least one mounting bracket 46, at least one extension arm 48 connected to the at least one mounting bracket 46 at one end thereof and extending therefrom, and a post 50 at the opposing end of the at least one extension arm 48. In an exemplary embodiment, and as illustrated in the figures, the cable support frame 42 preferably includes two spaced-apart mounting brackets 46, two extension arms 48, each extending from respective mounting brackets 46 and converging toward each other, and the post 50 at the converging ends of the two extension arms 48. Thus, the cable support frame 42 may have a generally triangular configuration. It should be appreciated, however, that other numbers and arrangements of mounting brackets 46 and extension arms 48 may be possible and the cable support frame 42 should not be limited to that shown and described herein.

The mounting brackets 46 constitute a mounting interface of the cable support frame configured to be selectively attached to and detached from the cable support 36. As noted above, the mounting brackets 46 may be spaced apart from each other to provide stability to the cable support frame 42 when mounted on the cable support 36. In an exemplary embodiment, each of the mounting brackets 46 may have an inverted J-shape configuration for hooking the mounting brackets 46 onto the cable support 36. For example, in one embodiment, each of the mounting brackets 46 may include a first elongate leg 52, a base leg 54 extending from an end of the first leg 52 (e.g., in a perpendicular direction), and a second leg 56 extending from an opposing end of the base leg 54. The second leg 52 may be generally parallel to the first leg 52 (e.g., +\-5 degrees) but is generally shorter in length (e.g., significantly shorter) than the first leg 52. The space bounded by the first leg 52, base leg 54, and second leg 56 generally defines a recess 58 configured to receive a portion of the cable support 36 therein to attach the routing tool 40, and more particularly the cable support frame 42, to the cable support 36.

The length of the base leg 54, i.e., the spacing between the first leg 52 and the second leg 56, may be sized to closely receive the portion of the cable support 36 therein to reduce any play between the routing tool 40 and the cable support 36 when mounted thereto. The engagement of the cable support 36 in the recesses 58 of the mounting brackets 46 represent a first point of contact between the mounting brackets 46 and the cable support 36. The length of the second leg 56 may be selected to maintain the attachment of the mounting brackets 46 to the cable support 36 during use, including when minor bumps or other perturbations of the routing tool 40 may occur. Moreover, and as discussed in more detail below, the length of the first leg 52 may be selected to provide a second point of contact between the mounting brackets 46 and the cable support 36 that is spaced from (e.g., vertically spaced from) the first point of contact at the hook end of the mounting brackets 46 (e.g., in the recess 58). This is illustrated, for example, in FIG. 5. These two points of contact enhance stability of the cable support frame 42 on the cable support 36 and minimize or eliminate rotations of the cable support frame 42 relative to the cable support 36 when the cable support frame 42 is mounted thereto. While the above described the mounting brackets 46 as being J-shaped, it should be appreciated that the mounting brackets 46 may include other hook-type configurations at an upper end thereof that allow the mounting brackets 46 to be easily attached to or latched onto the cable support 36. Additionally, the mounting brackets 46 may be formed from a suitably strong material, such as metal, for example. Other materials, however, such as suitable engineering plastics, may also be used to form the mounting brackets 46.

Each of the extension arms 48 includes a generally rectangular plate-like body 62 having a first inner end 64 connected to or connectable to a mounting bracket 46, a second outer end 66 connected to or connectable to the post 50, an upper edge 68, and a lower edge 70, both of which extend from the inner end 64 to the outer end 66. In one embodiment, the body 62 may be generally trapezoidal, where the height of the body 62 at the inner end 64 may be greater than the height of the body 62 at the outer end 66. Other configurations, however, are possible. In one embodiment (not shown), the body 62 may be generally solid. In an alternative embodiment, and as illustrated in the figures, the body 62 may include one or more openings 72 passing through a thickness of the body 62. Similar to the above, the extension arms 48 may be formed from a suitably strong material, such as metal, for example. Other materials, however, such as suitable engineering plastics, may also be used to form the extension arms 48.

In an exemplary embodiment, the post 50 may include a generally cylindrical body 74 having an upper end 76, a lower end 78, and a central passageway 80 at least partially extending from the upper end 76 toward the lower end 78. In one embodiment, the passageway 80 extends the full length between the upper end 76 and the lower end 78. As noted above, the post 50 is configured to be connected to or connectable to the second end 66 of each of the extension arms 48. The post 50 may be formed from a suitably strong material, such as metal, for example. Other materials, however, such as suitable engineering plastics, may also be used to form the post 50.

In one embodiment, a spindle 82 may be disposed between the dispensing platform 44 and the cable support frame 42 to more easily allow the dispensing platform 44 to rotate relative to the cable support frame 42. For example, the post 50 may include the spindle 82 and be configured to connect to the dispensing platform 44 and allow the dispensing platform 44 to rotate relative to the cable support frame 42. In one embodiment, the spindle 82 may include a lower extension shaft 84 received in the passageway 80 of the post 50 (such as in a friction fit), an upper extension shaft 86 configured to be received in the dispensing platform 44 (described in more detail below), and a bearing arrangement 88 connecting the lower shaft 84 and upper shaft 86 and allowing the upper shaft 86 to rotate relative to the lower shaft 84. While in this embodiment, the spindle 82 has been described as part of the cable support frame 42, in an alternative embodiment, the spindle 82 may form part of the dispensing platform 44. In such an embodiment, the lower shaft 84 of the spindle 82 would be inserted into the passageway 80 of the post 50 to connect the dispensing platform 44 to the cable support frame 42. In a further embodiment, the spindle 82 may be omitted and the dispensing platform 44 attached directly to the post 50.

Figure 5:
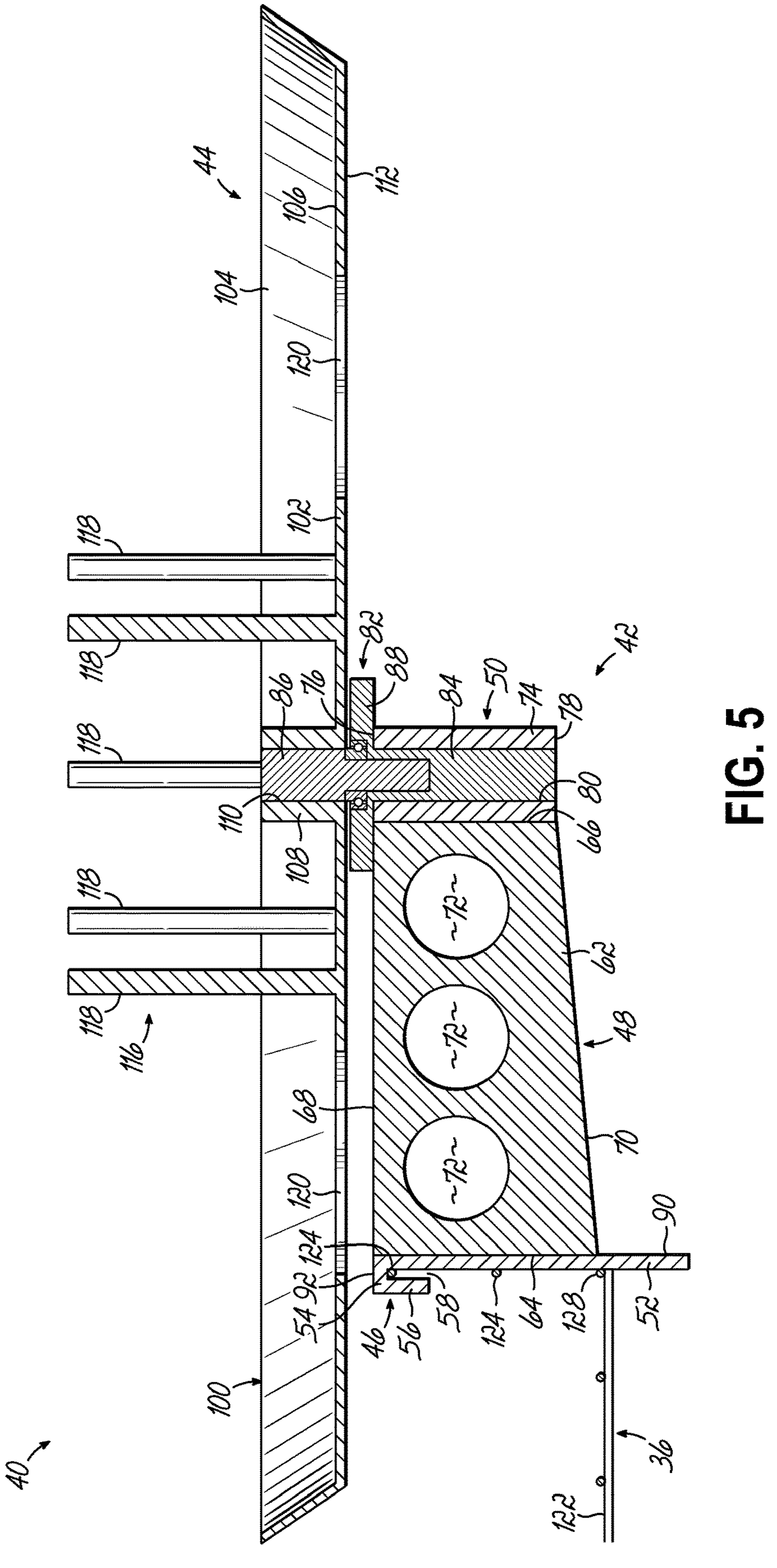
FIG. 5 is a partial cross-sectional view of the routing tool and cable support illustrated in FIG. 4.

In one embodiment, and as illustrated in FIG. 5, each of the extension arms 48 may be configured to be permanently attached to the mounting brackets 46. By way of example, the inner end 64 of each of the extension arms 48 may be welded, bonded, etc. to an outer surface 90 (e.g., the bracket surface opposite the one from which the base leg 54 extends) of respective mounting brackets 46. In one embodiment, the extension arms 48 may be attached to their respective mounting brackets 46 such that the upper edge 68 at the inner end 64 is generally flush with the outer surface 92 of the base leg 54. In alternative embodiments, however, the upper edge 68 of the extension arms 48 may be above or below the outer surface 92 of the mounting brackets 46.

In a similar manner, the outer end 66 of each of the extension arms 48 may be permanently welded, bonded, etc. to the post 50. In one embodiment, the post 50 may have a height such that the upper end 76 of the post 50 is generally flush with the upper edge 68 of the extension arms 48 and the lower end 78 of the post 50 is generally flush with the lower edge 70 of the extension arms 48. In an alternative embodiment, the post 50 may have a height greater than or less than the height of the outer end 66 of the extension arms 48. In this embodiment, mounting brackets 46, extension arms 48, and the post 50 collectively define a single, connected unitary body not meant or intended to be separated or taken apart but to operate as a unit.

Figure 6:
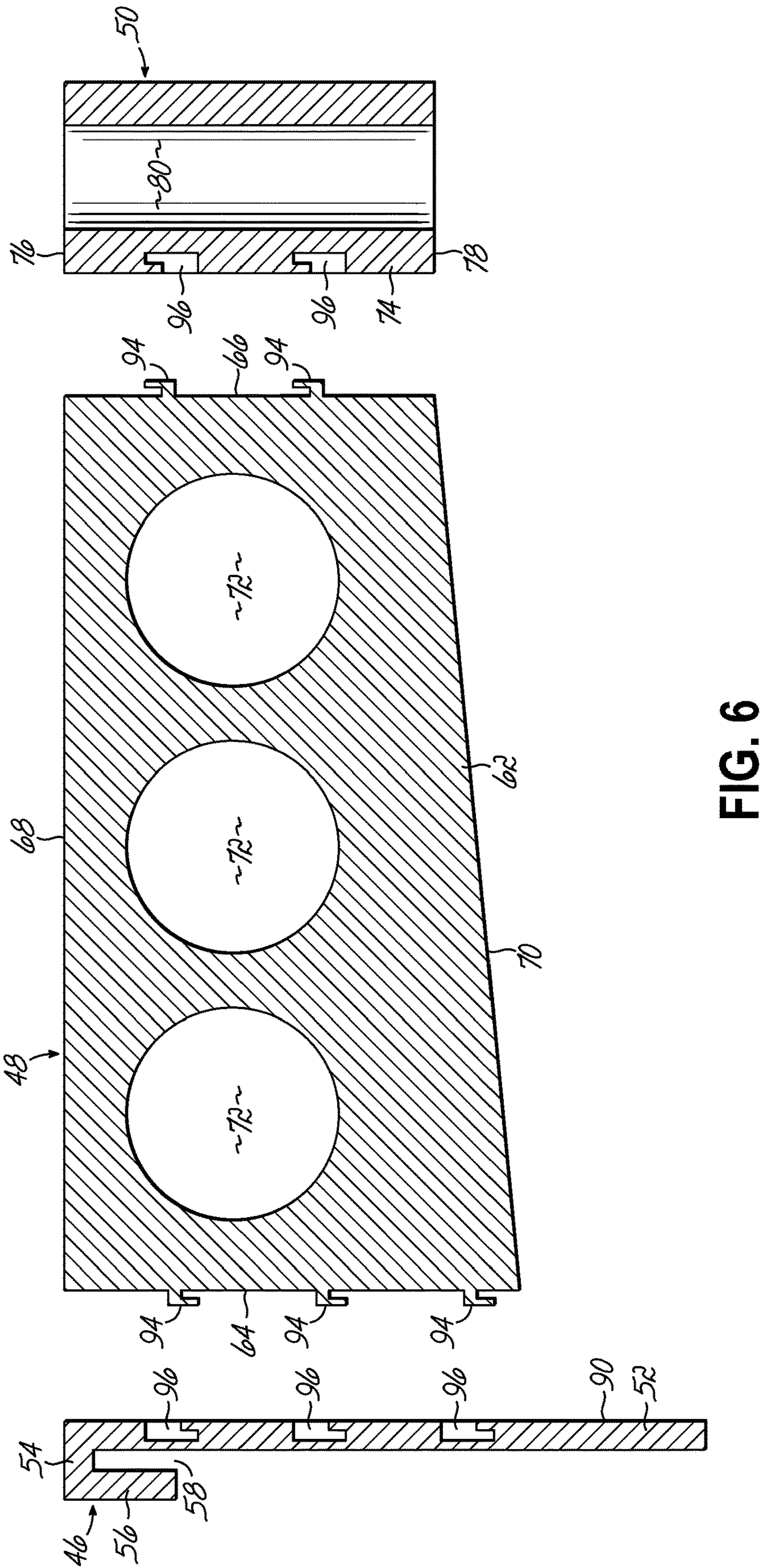
FIG. 6 is a cross-sectional view of a cable support frame in accordance with an embodiment of the disclosure configured to be selectively assembled and disassembled.
Figure 7:
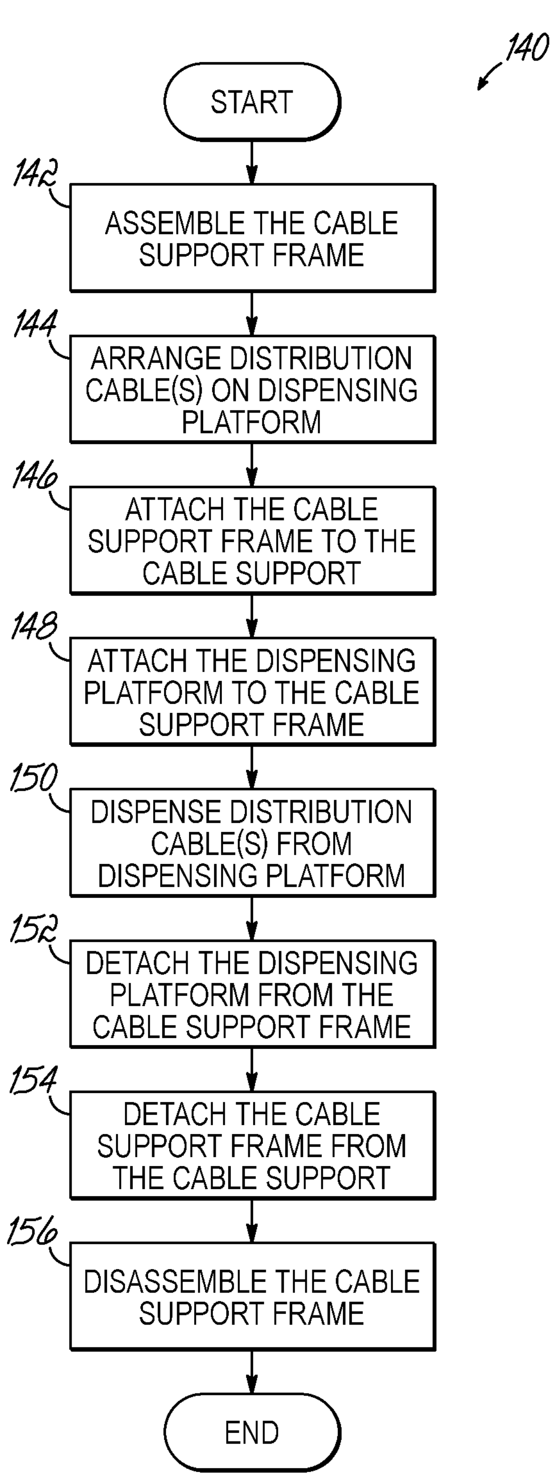
FIG. 7 is a flowchart illustrating a method of routing a fiber optic cable along a cable support using a routing tool in accordance with an embodiment of the disclosure.

In another embodiment, however, and as illustrated in FIG. 6, the elements that make up the cable support frame 42 may be separable from each other and configured to be selectively attached to and detached from each other to form the cable support frame 42. In this embodiment, the inner end 64 and the outer end 66 of each of the extension arms 48 may include a releasable connection for achieving the selective connection to/from the mounting brackets 46 and the post 50. By way of example, the releasable connection may include at least one finger 94 (e.g., an L-shaped finger) for connecting the extension arms 48 to respective mounting brackets 46 and to the post 50. Preferably, each of the extension arms 48 may include a plurality of fingers 94 distributed along each of the inner end 64 and the outer end 66. Further in this embodiment, the mounting brackets 46 and the post 50 may each include at least one slot 96, and preferably a plurality of spaced-apart slots 96, each configured to receive a finger on the inner and outer ends 64, 66 of the mounting brackets 46, respectively.

To connect the inner end 64 of the extension arms 48 to the mounting brackets 46, the fingers 94 on the inner end 64 may be inserted into respective slots 96 on the mounting brackets 46 and the extension arms 48 moved downwardly relative to the mounting brackets 46. In a similar manner, to connect the outer end 66 of the extension arms 48 to the post 50, the fingers 94 on the outer end 66 may be inserted into respective slots 96 on the post 50 and the extension arms 48 moved downwardly relative to the post 50. In this embodiment, mounting brackets 46, extension arms 48 and the post 50 are configured to be selectively assembled and disassembled.

While the above discussed using L-shaped fingers 94 and corresponding slots 96 to make the releasable connection between the extension arms 48 and the mounting brackets 46 and the post 50, other types of releasable connectors (e.g., male/female connectors) may be used to make the connections. Thus, in this embodiment, the mounting brackets 46, extension arms 48, and the post 50 are intended to be separable from each other but may be assembled for periods of use of the routing tool 40 and disassembled for periods of non-use of the routing tool 40. The ability to assemble/disassemble the cable support frame 42 may facilitate storage and/or transportation of the routing tool 40.

In a further alternative embodiment, the outer end 66 of the extension arms 48 may be configured to be permanently connected to the post 50 while the inner ends 64 of the extension arms 48 may be configured to be selectively attachable/detachable to the mounting brackets 46, such as by the finger 94 and slot 96 arrangement described above. Alternatively, the inner ends 64 of the extension arms 48 may be configured to be permanently connected to the mounting brackets 46 while the outer ends 66 of the extension arms 48 may be configured to be selectively attachable/detachable to the post 50, such as by the finger 94 and slot 96 arrangement described above. Thus, some amount of assembly/disassembly may be necessary with these alternative embodiments.

Turning now to the dispensing platform 44, in an exemplary embodiment, the platform 44 includes a generally circular body 100 having a base wall 102 and an upturned flange 104 along the outer periphery of the base wall 102. An inner surface 106 of the base wall 102 includes a central hub 108 having a passageway 110 extending along the hub 108 and open to an outer surface 112 of the base wall 102. The passageway 110 of the hub 108 may be configured to receive the upper shaft 86 of the spindle 82 associated with the post 50. As such, the central hub 108 generally defines a rotational axis 114 of the dispensing platform 44. The inner surface 106 of the base wall 102 may also include a drum 116 that defines a radially inward boundary about which the one or more distribution cables 38 may be wound. In one embodiment (not shown), the drum 116 may be defined by a solid cylindrical wall surrounding but radially spaced from the central hub 108. In the illustrated embodiment, however, the drum 116 may be generally defined by a plurality of columns 118 circumferentially spaced at a fixed radial position about the central hub 108. The drum 116 may be defined by other structural elements that provide a partial or full inner boundary for the distribution cable 38.

The base wall 102 of the dispensing platform 44 may additionally include a plurality of radially directed fenestrations 120 (e.g., rectangular slots) circumferentially spaced about the central hub 108. In one embodiment, the fenestrations 120 do not penetrate radially inward of the drum 112 and may stop short of the upturned flange 104 as illustrated in the figures. The fenestrations 120 are configured to allow tie downs (not shown), such as strings, wires, zip ties, tapes, etc., or other cable-organizing elements to be used to organize and/or secure the one or more distribution cables 38 to the dispensing platform 44 during transport, storage, and/or use. The dispensing platform 44 may be formed from a suitably strong material, such as metal, for example. Other materials, however, such as suitable engineering plastics, may also be used to form the dispensing platform 44. Alternatively, the dispensing platform 44 may be formed from a suitably strong cardboard material, and preferably a recyclable cardboard material.

With the routing tool 40 described above, a method 140 of using the routing tool 40 to install one or more distribution cables 38 will now be described. For this description, it will be assumed that the cable support 36, such as a traditional cable tray, is already erected along a row 28 at which racks 32 are or will be arranged. In a first step 142, if necessary, the cable support frame 42 may be assembled from its separate components. As described above, the inner ends 64 of the extension arms 48 may be attached to respective mounting brackets 46 and the outer ends 64 of the extension arms 48 may be attached to the post 50. This may be achieved, for example, using the finger 94 and slot 96 arrangement described above. In the embodiment where the spindle 82 is associated with the cable support frame 42, the spindle 82 may be attached to the post 50 by inserting the lower shaft 84 into the passageway 80 of the post 50. The lower shaft 84 may be rotationally fixed in the passageway 80. However, because of the bearing arrangement 88, the upper shaft 86 remains rotatable.

In a second step 144, the one or more distribution cables 38 may be arranged onto the dispensing platform 44. In one embodiment, this may be completed in the field, such as in the data hall 26 at the data center 10 where the installation is taking place. For example, the one or more distribution cables 38 may come from the factory pre-packaged. A field technician may then remove the one or more distribution cables 38 from its packaging and wind the one or more cables 38 about the drum 116 on the platform 44 until the entire length of the distribution cables 38 is disposed on the dispensing platform 44. In an alternative embodiment, however, the one or more distribution cables 38 may be shipped from the manufacturing facility already arranged on a dispensing platform 44. In this embodiment, the step of winding the one or more cables 38 may be omitted in the field and the field technician may simply remove the dispensing platform 44 and one or more distribution cables 38 from its packaging for connection to the cable support frame 42, as will be explained below. In one embodiment, the dispensing platform 44 may form part of the packaging from the manufacturing facility.

In a third step 146, the cable support frame 42 may be attached to the cable support 36. In one embodiment, the cable support 36 is configured as a cable tray having a base wall 122 and two upstanding side walls 124 at opposed longitudinal edges of the lower wall 122, as is generally known in the fiber optics industry. To connect the cable support frame 42 to the cable support 36, the mounting brackets 46 may be faced toward one of the side walls 124 such that the recesses 58 at the hook end of the mounting brackets 46 are disposed above the upper edge 126 of the side walls 124. The cable support frame 42 may then be lowered such that the upper edge 126 of the side wall 124 is received in the recesses 58 of the mounting brackets 46, as illustrated in FIG. 5. As discussed above, the spaced-apart configuration of the mounting brackets 46 provides a stable connection with the cable support 36. Additionally, as noted above, a portion of the cable support 36 contacts the mounting brackets 46 at a second contact point 128 spaced apart and below the recesses 58. These two points of contact provide rotational stability of the cable support frame 42 when attached to the cable support 36. When the mounting brackets 46 are attached to the side wall 124 of the cable support 36, the extension arms 48 extend outwardly and away from the side wall 124 to which the mounting brackets 46 are attached such that the post 50 is laterally spaced apart from the mounting brackets 46 and the cable support 36 (see FIG. 5).

In a fourth step 148, the dispensing platform 44 may be attached to the cable support frame 42. In the embodiment where the spindle 82 is associated with the cable support frame 42, this step may include inserting the upper shaft 86 of the spindle 82 into the passageway 110 of the central hub 108 of the dispensing platform 44 via its outer surface 112. The upper shaft 86 may form a friction fit with the passageway 110 to secure the dispensing platform 44 to the cable support frame 42. Alternatively, the dispensing platform 44 may be secured to the cable support frame 42 via a pin, clip, screw, or other type of fastener. In the embodiment where the spindle 82 is associated with the dispensing platform 44, this step may include inserting the lower shaft 84 of the spindle 82 into the passageway 80 of the post 50 of the cable support frame 42 via its upper end 76. The lower shaft 84 may form a friction fit with the passageway 80 to secure the dispensing platform 44 to the cable support frame 42. Alternatively, the dispensing platform 44 may be secured to the cable support frame 42 via a pin, clip, screw, or other type of fastener.

Figure 4:
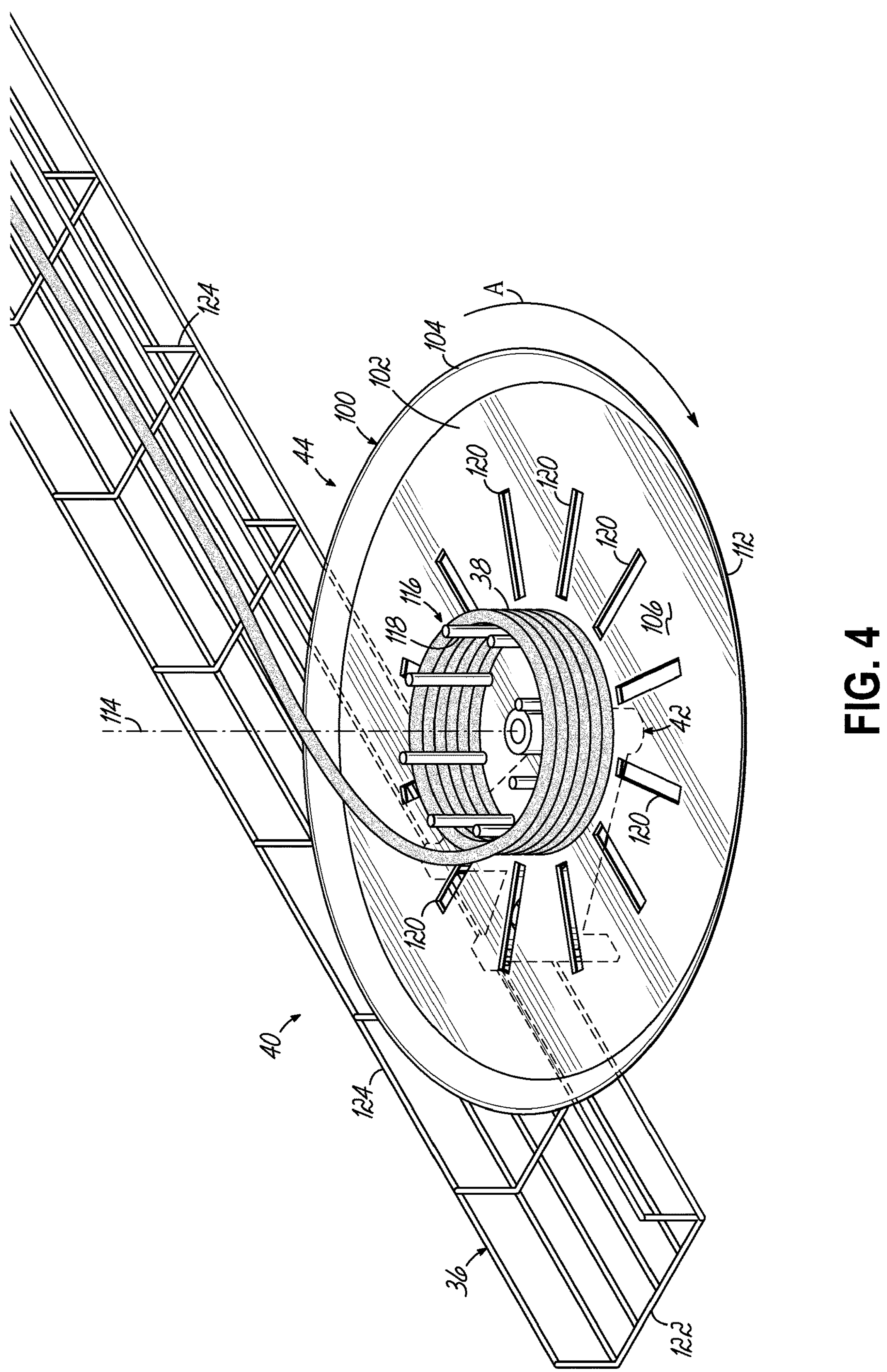
FIG. 4 is a perspective view of the routing tool of FIG. 3 attached to a cable support in accordance with an embodiment of the disclosure.

Due to the bearing arrangement 88 of the spindle 82, the dispensing platform 44 is able to freely spin or rotate relative to the cable support frame 42 about the rotational axis 114. In one embodiment, the extension arms 48 of the cable support frame 42 and the dispensing platform 44 are sized such that the rotational axis 114 is laterally offset from the mounting brackets 46 and, when the routing tool 40 is attached to the cable support 36, the outer periphery defined by the upturned flange 104 of the dispensing platform 44 is positioned radially outboard of the mounting brackets 46. In this way, the outer periphery of the dispensing platform 44 is generally disposed between the two side walls 124, and preferably centrally between the two side walls 124, of the cable support 36. This arrangement is illustrated in FIGS. 4 and 5 and facilitates placement of the one or more distribution cables 38 in the cable support 36.

In a fifth step 150, after the routing tool 40 is attached to the cable support 36 as described above, a field technician may pull on the end of the distribution cable 38 arranged on the dispensing platform 44 to route the distribution cable 38 along the cable support 36. In an advantageous aspect, the routing tool 40 allows the distribution cable to be routed along the cable support 36 using a single field technician instead of multiple technicians as is common in prior art installation procedures. If more than one distribution cable 38 is to be installed, then after one cable 38 has been installed, the dispensing platform 44 may be removed from the cable support frame 42 and reloaded with another distribution cable 38. Alternatively, another dispensing platform 44 having a distribution cable 38 loaded thereon may be attached to the cable support frame 42 and routed along the cable support 36 as described above. This may be repeated until the desired number of distribution cables 38 have been installed. In a further alternative embodiment, multiple distribution cables 38 may be arranged on the dispensing platform 44, each being routed along the cable support 36 as described above without reloading or replacing the dispensing platform 44. As can be appreciated from the above, the use of a routing tool 40 for the installation of one or more distribution cables 38 will decrease installation time and labor costs associated with data center construction.

After the number of desired distribution cables 38 have been installed along the cable support 36 in the row 28, the routing tool 40 may be removed from the cable support 36. For example, in another step 152, the dispensing platform 44 may be detached from the cable support frame 42, and in a further step 154, the cable support frame 42 may be detached from the cable support 36 by lifting the cable support frame 42 upwardly such that the side wall 124 disengages the recesses 58 of the mounting brackets 46. Should the cable support frame 42 be separable, then in yet another step 156, the parts may be disassembled by reversing the assembly steps described above. The routing tool 40 may then be stored or transported to a different location for future use.

As noted above, by using the routing tool 40, the installation of one or more distribution cables 38 along the cable support 36 may be improved. By way of example, it is contemplated that by using the routing tool 40, the installation of the one or more distribution cables 38 may be performed by a single field technician, instead of multiple technicians. Additionally, by using the routing tool 40, the amount of time it takes to install the one or more distribution cables 38 is believed to be significantly reduced. With the large amount of cabling required in data center construction, it is believed that the routing tool 40 may significantly reduce installation time and costs.

While the present disclosure has been illustrated by the description of specific embodiments thereof, and while the embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The disclosure in its broader aspects is therefore not limited to the specific details, representative apparatus and methods and illustrative examples shown and described. Accordingly, departures may be made from such details without departing from the scope of the disclosure.

What is claimed is:

1. A routing tool for the installation of one or more fiber optic cables along a cable support, comprising:

a cable support frame including a mounting interface, the cable support frame configured to be selectively attached to and detached from the cable support at the mounting interface; and a dispensing platform configured to have the one or more fiber optic cables arranged thereon and configured to be selectively attached to and detached from the cable support frame, the dispensing platform further configured to be rotatable relative to the cable support frame about a rotational axis when the dispensing platform is attached thereto, wherein the cable support frame is configured such that the rotational axis is laterally offset from the mounting interface, and wherein when the dispensing platform is attached to the cable support frame and the routing tool is attached to the cable support, the dispensing platform is positioned over top the mounting interface such that an outer edge of the dispensing platform extends outboard of the mounting interface so as to be positioned over top the cable support.

2. The routing tool of claim 1, wherein the mounting interface of the cable support frame includes at least one J-shaped mounting bracket, the at least one J-shaped mounting bracket defining a recess configured to receive a portion of the cable support therein.

3. The routing tool of claim 2, wherein the mounting interface includes at least two spaced-apart J-shaped mounting brackets.

4. The routing tool of claim 1, wherein the cable support frame further comprises at least one extension arm configured to extend from the mounting interface.

5. The routing tool of claim 4, wherein the at least one extension arm includes at least two extension arms extending from the mounting interface.

6. The routing tool of claim 4, wherein the at least one extension arm is configured to be selectively attached to and detached from the mounting interface via a releasable connection.

7. The routing tool of claim 4, wherein the cable support frame further comprises a post configured to be connected to the at least one extension arm, the post configured to be selectively attached to and detached from the dispensing platform to thereby provide the lateral offset between the rotational axis and the mounting interface.

8. The routing tool of claim 7, wherein the post is configured to be selectively attached to and detached from the at least one extension arm via a releasable connection.

9. The routing tool of claim 1, wherein the dispensing platform comprises a base wall having a central hub that defines the rotational axis.

10. The routing tool of claim 9, wherein the base wall comprises a drum that defines an inner boundary for the one or more fiber optic cables when the one or more fiber optic cables is arranged thereon.

11. The routing tool of claim 10, wherein the drum comprises a plurality of circumferentially spaced columns.

12. The routing tool of claim 1, wherein the routing tool further comprises a spindle configured to be disposed between the cable support frame and the dispensing platform, the spindle including a bearing arrangement to allow relative rotation between the cable support frame and the dispensing platform.

13. A method of installing one or more fiber optic cables along a cable support using a routing tool that includes a cable support frame and a dispensing platform, the method comprising:

attaching the cable support frame to the cable support;

attaching the dispensing platform to the cable support frame at a mounting interface of the cable support frame, the dispensing platform having the one or more fiber optic cables arranged thereon, and wherein the dispensing platform is positioned over top the mounting interface such that an outer edge of the dispensing platform extends outboard of the mounting interface so as to be positioned over top the cable support; and dispensing the one or more fiber optic cables from the routing tool to route the one or more fiber optic cables along the cable support, wherein the dispensing platform rotates relative to the cable support frame about a rotational axis during the dispensing, and wherein the cable support frame is configured such that the rotational axis is laterally offset from the mounting interface of the cable support frame.

14. The method of claim 13, wherein the cable support includes a base wall and two side walls extending from the base wall, and wherein attaching the cable support frame to the cable support further comprises attaching the cable support frame to one of the side walls of the cable support.

15. The method of claim 14, wherein attaching the cable support frame to the cable support further comprises hooking the cable support frame to an upper edge of one of the side walls of the cable support.

16. The method of claim 13, further comprising assembling the cable support frame.

17. The method of claim 13, further comprising arranging the one or more fiber optic cables on the dispensing platform at a field location.

18. The method of claim 13, further comprising:

arranging the one or more fiber optic cables on the dispensing platform at a manufacturing location; and shipping the dispensing platform and the one or more fiber optic cables to a field location for use with the routing tool.

19. The method of claim 13, further comprising:

detaching the dispensing platform from the cable support frame; and detaching the cable support frame from the cable support.

* * * * *